United States Patent
Yamaguchi et al.

(10) Patent No.: US 6,789,104 B1
(45) Date of Patent: Sep. 7, 2004

(54) COMMUNICATIONS SYSTEM AND METHOD WITH EMULATED-LAN ASSIGNMENT CAPABILITIES

(75) Inventors: Minoru Yamaguchi, Kawasaki (JP); Hideyasu Kanemaki, Kawasaki (JP); Takeshi Okamoto, Kawasaki (JP); Katsuhisa Iriya, Kawasaki (JP); Namiko Imanari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 09/620,502

(22) Filed: Jul. 20, 2000

(30) Foreign Application Priority Data

Sep. 22, 1999 (JP) .......................................... 11-267993

(51) Int. Cl.[7] .......................... G06F 15/16; H04L 12/12
(52) U.S. Cl. ............. 709/203; 370/395.53; 370/395.54; 709/249
(58) Field of Search ..................... 395/53, 51; 709/249, 709/203, 217, 225, 229; 370/395.53, 395.54, 395.3, 395.31, 398, 399

(56) References Cited

U.S. PATENT DOCUMENTS

| | | | | |
|---|---|---|---|---|
| 5,600,644 A | * | 2/1997 | Chang et al. ................ | 370/404 |
| 5,805,805 A | * | 9/1998 | Civanlar et al. ............. | 709/220 |
| 5,812,552 A | * | 9/1998 | Arora et al. ............ | 370/395.53 |
| 5,878,043 A | * | 3/1999 | Casey ......................... | 370/397 |
| 5,878,212 A | * | 3/1999 | Civanlar et al. ............. | 709/203 |
| 5,884,064 A | * | 3/1999 | Rosenberg ............... | 370/395.3 |
| 5,912,891 A | * | 6/1999 | Kanai ..................... | 370/395.51 |
| 5,946,311 A | * | 8/1999 | Alexander et al. ..... | 370/395.53 |
| 6,005,864 A | * | 12/1999 | Krause .................. | 370/395.53 |
| 6,016,319 A | * | 1/2000 | Kshirsagar et al. ......... | 370/399 |
| 6,104,870 A | * | 8/2000 | Frick et al. ............. | 370/395.53 |
| 6,426,954 B1 | * | 7/2002 | Krause ................... | 370/395.53 |
| 6,516,000 B1 | * | 2/2003 | Kshirsagar et al. ......... | 370/399 |
| 6,671,281 B1 | * | 12/2003 | Tsuda ..................... | 370/395.53 |

FOREIGN PATENT DOCUMENTS

JP 09093266 4/1997

OTHER PUBLICATIONS

"LAN Emulation Over ATM, Version 1.0, af–lane–0021.000", The ATM Forum, Jan. 1995.*
"LAN Emulation Servers Mamangement Specification 1.0, af–lane–0057.ooo", The ATM Forum, Mar. 1996.*

* cited by examiner

Primary Examiner—Marc D. Thompson
(74) Attorney, Agent, or Firm—Katten Munchin Zavis Rosenman

(57) ABSTRACT

A communication system and method which automatically assign an appropriate emulated LAN (ELAN) domain to each attached end station. In the LAN emulation configuration server, an ATM address manager manages the associations between LAN stations and their relevant LAN emulation servers. When the identifier of a LAN station is given, it returns the ATM address of a suitable server for that station. To send such address requests, each LAN emulation client has an ATM address requesting unit. The ATM address requesting unit also requests the LAN emulation server to provide the ATM address of a broadcast server for the assigned ELAN. The obtained ATM addresses are stored and managed in an ELAN configuration database, together with the identifiers of stations and information about established network connections. Based on those operating parameters stored in the ELAN configuration database, a data communication unit conducts communication sessions between peer LAN stations.

11 Claims, 14 Drawing Sheets

11-1 ATM ADDRESS RESOLUTION TABLE

| IP SUBNET ADDRESS (11a-1) | LES ATM ADDRESS (11a-2) |
|---|---|
| 1 3 3. 1 6 2. 1. 0 | 7 1 8 7 2 2 2 2 |
| 1 3 3. 1 6 2. 2. 0 | 7 1 8 7 3 3 3 3 |
|  |  |

FIG. 4

11-2 ATM ADDRESS RESOLUTION TABLE

| IP SUBNET ADDRESS (11a-1) | LES ATM ADDRESS (11a-2) | ELAN-ID (11a-3) |
|---|---|---|
| 1 3 3. 1 6 2. 1. 0 | 7 1 8 7 2 2 2 2 | 1 |
| 1 3 3. 1 6 2. 2. 0 | 7 1 8 7 3 3 3 3 | 2 |
|  |  |  |

FIG. 5

LE_CONFIGURE_REQUEST 24-1 ELAN-ID RESOLUTION TABLE

| IP SUBNET ADDRESS | ELAN-ID |
|---|---|
| 1 3 3. 1 6 2. 1. 0 | 1 |
| 1 3 3. 1 6 2. 2. 0 | 2 |
|  |  |

22-1 ELAN PARAMETER CACHE TABLE

| 22a-1 PORT NUMBER | 22a-2 STATUS | 22a-3 IP ADDRESS | 22a-4 LES ATM ADDRESS | 22a-5 LES ATM CONNECTION | 22a-6 BUS ATM ADDRESS | 22a-7 BUS ATM CONNECTION |
|---|---|---|---|---|---|---|
| #1 | 0 | 133.162.2.80 | 71872222 | VPI=4 VCI=5 | 71872223 | VPI=4 VCI=6 |
| #2 | | | | | | |
| #3 | | | | | | |

COMMUNICATIONS SYSTEM AND METHOD WITH EMULATED-LAN ASSIGNMENT CAPABILITIES

BACKGROUND OF THE INVENTION

1. Field of the Invention

The present invention relates to a communications system and method, and particularly to a communications system and method which emulate connectionless LAN environments on a connection-oriented transport network and automatically assign them to end stations.

2. Description of the Related Art

Asynchronous Transfer Mode (ATM) is a promising technology for multimedia data communications, which offers a range of transmission rates and different qualities of service to efficiently handle various types of I/O traffic over a single network medium, such as data, audio, and video. ATM, a cell-based transport mechanism, enables end stations to communicate through a pre-established path called a virtual channel, and hence is connection oriented. In contrast to this, existing local area networks (LANs) use connectionless protocols and broadcast functions, which cannot guarantee the bandwidth and quality of service required for delivery of realtime audio and video information. Since it is beneficial to combine those technologies, ATM-LAN systems have been developed. This ATM-LAN emulates LAN services across an ATM transport system, realizing more cost-effective and seamless network connections for existing and future LAN applications.

The ATM Forum's LAN Emulation (LANE) specifications Ver 1.0 and 2.0 define the mechanisms to use the vast base of existing LAN applications on an ATM transport system. The LANE emulates network services at the Media Access Control (MAC) layer.

Typically, existing LAN stations are designed to operate on the Ethernet. Because of the lack of a direct ATM access capability, most LAN stations are attached to the ATM network via appropriate ATM hubs or routers having ATM interface. In the LANE terminology, those ATM hubs and routers are referred to as the "LAN emulation clients" (LECs). LAN stations exchange messages with their local LECs, using well-known Ethernet protocols, while the LECs communicate with their peer LECs over an ATM network, according to message formats defined in the LANE specifications. Those LECs provides the LAN end stations with seamless connections, so that LAN applications can be integrated transparently with the ATM network.

FIG. 14 shows the configuration of an ATM network with LAN emulation capabilities. A group of LAN end stations ("stations" for short) 2a to 2c are connected to their nearest ATM hub 200, while another group of stations 3a to 3c to another ATM hub 300. The ATM hubs 200 and 300 are linked with each other via a "cloud" of switched connection services provided by ATM switching facilities (ATM-SW) 600. This ATM connection service cloud is also coupled to the following LANE elements: a LAN Emulation Configuration Server (LECS) 100, LAN Emulation Servers (LES) 400-1 and 400-2, and Broadcast and Unknown Servers (BUS) 500-1 and 500-2.

The above-listed network elements operate as follows. The ATM switching facilities 600 provide end-to-end switched connectivity for multiple users, with the ATM technologies. The LECS 100 is a server which provides LANE clients with the address of the most appropriate LES and maintains a database of the resultant associations. When joining the network, every LEC (i.e., two ATM hubs in the present case) first turns to the LECS 100, sending a configuration request message requesting information about which LES should be used. The LECS 100 responds to this request by assigning an appropriate LES to the requesting LEC and sending back the ATM address of that LES. The LESs 400-1 and 400-2 provide address resolution services in two emulated LAN environments, which are logically defined on the same ATM network. The BUSs 500-1 and 500-2 support broadcast traffic over the emulated LAN environments. The ATM hubs 200 and 300 are multiport devices accommodating a plurality of LAN stations, the ports of which can be logically assigned to different LAN segments (or broadcast domain), each group of stations forming a separate emulated LAN (ELAN). Two LAN environments are realized in this way, independently of the physical locations of their end stations.

The illustrated system provides two ELANs, which are distinguished by their ELAN-IDs (or ELAN names), ELAN-1 and ELAN-2. Ports on the two ATM hubs 200 and 300 are assigned those ELAN-IDs as shown in the lower half of FIG. 14. That is, the ports #1 and #2 on the ATM hub 200 and the same on the ATM hub 300 are for the first ELAN environment, ELAN-1. This assignment allows the stations 2a, 2b, 3a, and 3b to communicate with each other within the domain of ELAN-1. On the other hand, the ports #3 and #4 on the ATM hub 200 and the same on the ATM hub 300 are for the second ELAN environment, ELAN-2. This allows the stations 2c and 3c to communicate with each other within the domain of ELAN-2. The LES 400-1 and BUS 500-1 are dedicated to ELAN-1, and the LES 400-2 and BUS 500-2 to ELAN-2.

Conventional ATM hubs, however, require manual set-up operations so that appropriate ELAN-IDs will be assigned to their ports. If the port setup conflicts with the operating parameters of the station being connected, the ATM hub cannot work correctly with that station. Suppose, for example, that the user has relocated the station 2a from port #1 to port #3 on the ATM hub 200. In this case, the station 2a can no longer work as a member of ELAN-1, since the port #3 is assigned to ELAN-2. To make the station operate correctly, he/she has to modify the current setup of the ATM hub. This is indeed a burdensome task, particularly for corporate users of ATM-LAN systems. For those users, relocation of LAN stations from one office floor to another is not an unusual event because their organizations tend to change dynamically to remain competitive. In the case that a separate ELAN is deployed for each organizational unit, frequent relocation of stations could impose increased workloads on the network administrators since they have to redefine the ELAN-ID setups of ATM hubs. For this reason, there has been a need for more flexible and easy-to-use ELAN systems.

SUMMARY OF THE INVENTION

Taking the above into consideration, an object of the present invention is to provide a communications system which automatically assign an appropriate ELAN-ID to each attached end station, whichever hub port is used to physically accommodate the station.

Further, another object of the present invention is to provide a communication method which constructs emulated LAN environments on a connection-oriented network.

To accomplish the first object, according to the present invention, there is provided a communications system which constructs emulated LAN environments on a connection-oriented network. This system comprises the following elements: (a) a plurality of LAN stations each having an identifier; (b) a LAN emulation server employed in each emulated LAN environment to provide address resolution services thereon, each LAN emulation server having a network address (ATM address) on the connection-oriented network; (c) a broadcast server employed in each emulated LAN environment to support broadcast traffic thereon; (d) a LAN emulation configuration server; and (f) a LAN emulation client coupled to at least one of the LAN stations. Here, the LAN emulation configuration server comprises an ATM address manager which manages associations between the identifiers of the LAN stations and the ATM addresses of the LAN emulation servers, and when a specific identifier is given, determining which ATM address is relevant to the given identifier. Further, the LAN emulation client comprises the following elements: an ATM address requesting unit which requests the LAN emulation configuration server to provide the ATM address of the LAN emulation servers, as well as requests the LAN emulation servers to provide the ATM address of the broadcast servers associated therewith; an ELAN configuration database which stores operating parameters for the emulated LAN environments, including the identifiers of the LAN stations, the ATM addresses obtained in response to the request from the ATM address manager, and information about connections; and a data communication unit which transfers data according to the parameters stored in the ELAN configuration database.

To accomplish the second object described above, according to the present invention, there is provided a communication method which provides emulated LAN environments constructed on a connection-oriented network. This method comprises the following steps: (a) at a LAN emulation configuration server, managing associations between identifiers of LAN stations and ATM addresses of LAN emulation servers supporting the individual emulated LAN environments; (b) sending a request message from a LAN emulation client to the LAN emulation configuration server, the request message containing the identifier of a specific LAN station to request the ATM address of a LAN emulation server that is relevant to the LAN station; (c) sending an address request message from the LAN emulation client to the relevant LAN emulation server, so as to obtain the ATM address of a broadcast server supporting the emulated LAN environment to which the specific LAN station belongs; (d) storing operating parameters in the LAN emulation client, which include the ATM addresses returned in response to the request message sent at the step (b) and the address request message sent at the step (c), and information about network connections established to reach the LAN emulation server and broadcast server; and (d) conducting a communication session between the LAN stations within the emulated LAN environment, according to the stored operating parameters.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram which shows an example of an ATM address resolution table;

FIG. 5 is a diagram which shows another example of the ATM address resolution table;

FIG. 8 is a diagram which shows an example of an ELAN-ID resolution table;

FIG. 9 is a diagram which shows an example of an ELAN parameter cache table;

DESCRIPTION OF THE PREFERRED EMBODIMENTS

Preferred embodiments of the present invention will be described below with reference to the accompanying drawings.

Figure 1:
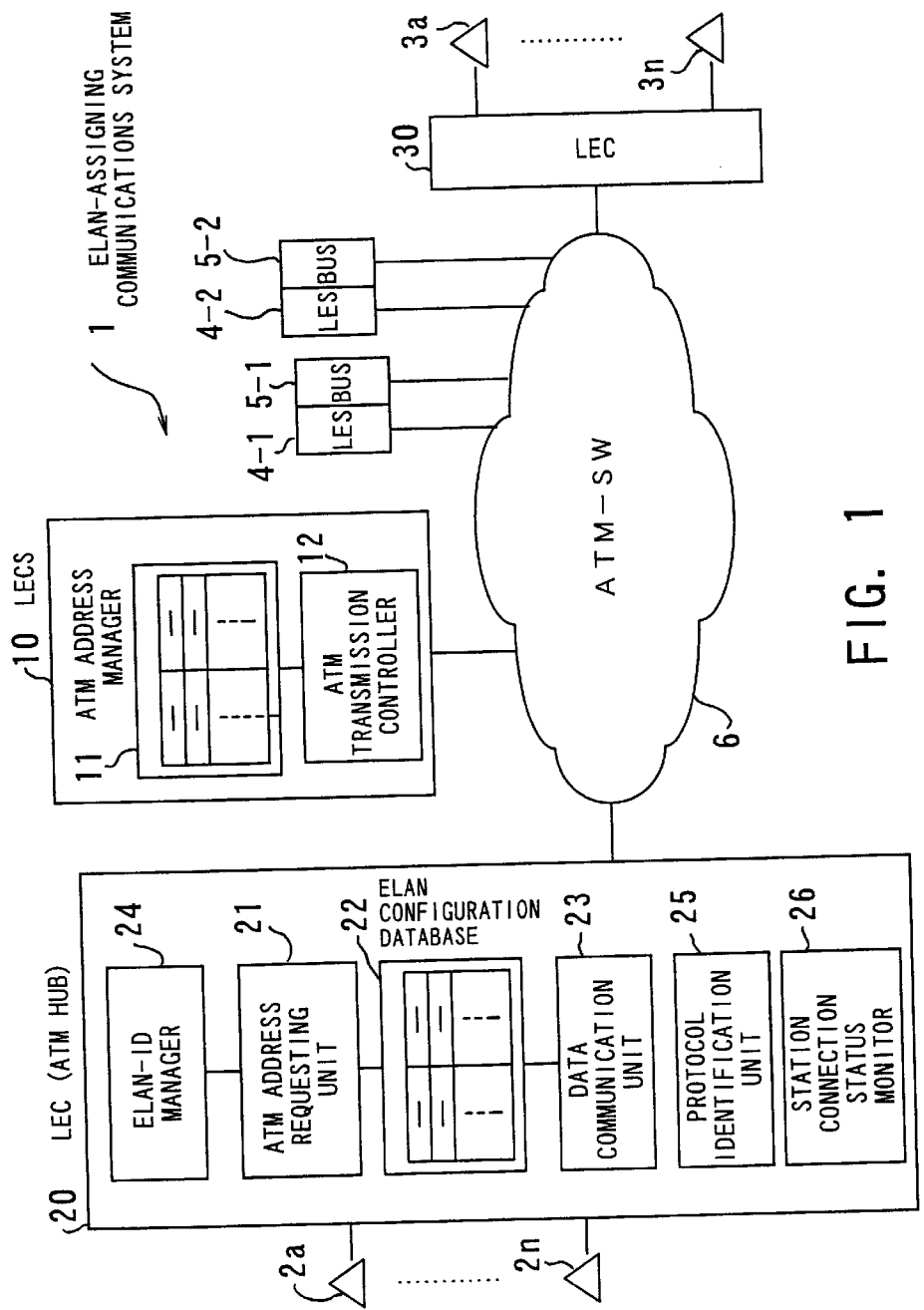
FIG. 1 is a conceptual view of a communications system according to the present invention.

FIG. 1 is a conceptual view of a communications system according to the present invention. This communications system 1 has emulated LAN (ELAN) assignment capabilities. That is, it automatically assigns appropriate ELAN domains to a plurality of LAN end stations attached directly or indirectly to an ATM transport system, thereby constructing ATM-LAN environments. Systems having such capabilities are called, in the present invention, the ELAN-assigning communications systems.

The illustrated communications system 1 provides its LAN emulation services to two group of stations. One LAN emulation client (LEC) 20 serves the first group of stations 2a to 2n, while another LEC 30 serves the second group of stations 3a to 3n. Those stations 2a to 2n and 3a to 3n use the TCP/IP protocols to communicate with their peers. Actually, the LECs 20 and 30 are ATM hubs each having an integral ATM interface to link with ATM switching facilities (ATM-SW) 6. Other network devices connected to the ATM-SW 6 are: a LAN emulation configuration server (LECS) 10, a first combination of a LAN emulation server (LES) 4-1 and a broadcast and unknown server (BUS) 5-1, and a second combination of a LES 4-2 and a BUS 5-2. This ELAN-assigning communications system 1 provides two separate ELAN environments, each having a unique identifier (ELAN-ID). The above-mentioned first LES-BUS combination serves the first ELAN environment (ELAN-1), and the second LES-BUS combination the second ELAN environment (ELAN-2).

According to the present invention, the LECS 10 comprises an ATM address manager 11 and an ATM transmission controller 12. In short, the ATM address manager 11 manages the associations between the stations 2a to 2n and their relevant LESs. It has a table to maintain the identifier of each station and the ATM address of its associated LES, each table entry indicating to which ELAN the station belongs. When the identifier of a particular station is given, the ATM address manager 11 scans the table to find the ATM address of its relevant LES. Suppose, for example, that the station 2a is a member of ELAN-1. In this case, the table should have an entry that associates the identifier of this station 2a and the ATM address of the LES 4-1 supporting the ELAN-1. What are referred to as the "identifiers" are the IP addresses or IP subnet addresses of LAN stations. The details of the table will be provided in a later part of this description.

The ATM transmission controller 12 transmits and sends ATM cells. Particularly when starting up, each LEC 20 and 30 attempts to discover its host LES by sending a configuration request message to the LECS about the ATM address of that LES. The ATM transmission controller 12 in the LECS 10 receives such a request from the LECs 20 or 30 through a prescribed ATM connection, and transmits a response message back to the requesting LEC, supplying the requested ATM address of the LES 4-1 or 4-2 and other necessary parameters.

According to the present invention, the LEC 20 (as well as the other LEC 30) comprises the following elements: an ATM address requesting unit 21, an ELAN configuration database 22, a data communication unit 23, an ELAN-ID manager 24, a protocol identification unit 25, and a station connection status monitor 26. Those elements are designed to provide the functions described below.

The ATM address requesting unit 21 issues an ATM address request when it becomes necessary in the course of normal LEC operation. Recall that, in LAN emulation, the LES is responsible for providing address resolution services in its own ELAN domain. Although not explicitly shown in the illustrated system of FIG. 1, the LESs 4-1 and 4-2 maintain the physical and logical address information about all LEC and BUS nodes within their respective ELAN domains, ELAN-1 and ELAN-2. Suppose, for example, that the LEC 20 has received the ATM address of the LES 4-1 from the LECS 10 in response to a configuration request. This response from the LECS 10 implies that the LEC 20 is now assigned to the ELAN environment ELAN-1, since the LES 4-1 is the LE server covering the ELAN-1. Using the ATM address of the LES 4-1 obtained in this way, the LEC 20 sets up an ATM connection to the LES 4-1. It then sends an ATM address request message to the LES 4-1, specifying the broadcast group address. The LES 4-1 returns the ATM address of the BUS 5-1.

The ELAN configuration database 22 manages various parameters related to the configuration of one or more ELANs which the LEC 20 should handle. They are referred to herein as the ELAN parameters, which include: IP address of each station, ATM addresses of relevant LESs and BUSs, and VPI and VCI values of pre-established ATM connections to reach the relevant LESs and BUSs (i.e., LESs 4-1 and 42, and BUSs 5-1 and 5-2). Those ATM address entries are collected through the LES discovery and address resolution process described in the previous paragraph. The ELAN configuration database 22 maintains such ELAN parameters in the form of a table, the details of which will be described later.

The data communication unit 23 sets up a connection between the LECs 20 and 30 according to the ELAN parameters, thus enabling two peer stations within the same ELAN to communicate with each other. The ELAN-ID manager 24 maintains the associations between IP subnet addresses and ELAN-IDs. When a specific IP subnet address is given, it will provide an associated ELAN-ID. The protocol identification unit 25 analyzes messages coming from the stations 2a to 2n to identify which communications protocol each station uses. The station connection status monitor 26 observes the connection status of each station 2a to 2n and determines whether it is "pass" or "fail." The details of the ELAN-ID manager 24, protocol identification unit 25, and station connection status monitor 26 will be discussed later.

The above-described configuration of the proposed ELAN-assigning communications system 1 determines the ELAN-ID of each station uniquely from its IP address. This feature of the invention ensures that the station is consistently assigned to the same ELAN wherever it is located.

Figure 2:
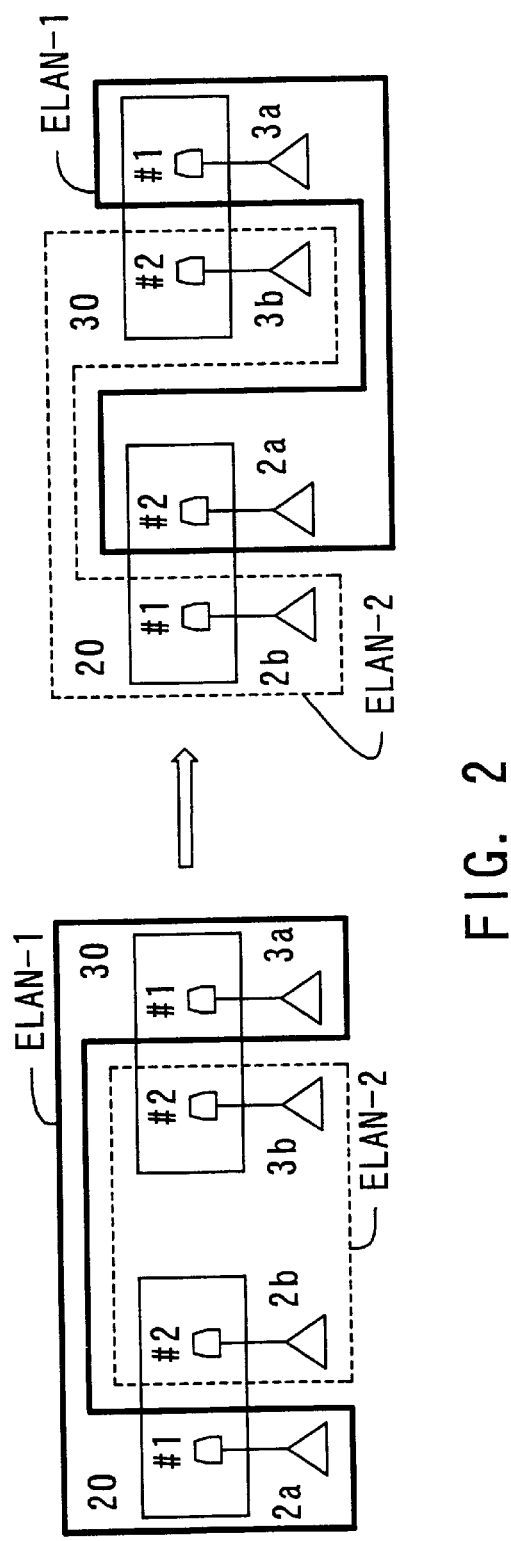
FIG. 2 is a diagram which shows how the system should be reconfigured when a station is relocated.

FIG. 2 shows how the system is reconfigured when a station is relocated. The left half of FIG. 2 depicts the original situation, where two stations 2a (LEC 20, port #1) and 3a (LEC 30, port #1) belong to ELAN-1, while the other two stations 2b (LEC 20, port #2) and 3b (LEC 30, port #2) to ELAN-2. The notes in parentheses indicate to which LEC, and to which port of that LEC, the station is connected. The right half of FIG. 2, on the other hand, illustrates a different situation; the stations 2a and 2b have been interchanged. Conventional systems, however, are unable to handle this case correctly because each station's ELAN-ID is determined from the number of the port to which the station is attached. Unlike such conventional systems, the present invention permits the stations to have their ELAN-IDs determined from their IP addresses. Thus the stations can keep staying on their respective original ELAN domains, regardless of their physical locations. In the present example, the proposed system enables the station 2a (LEC 20, port #2) to work with its peer station 3a (LEC 30, port #1), besides allowing the station 2b (LEC 20, port #1) to work with its peer station 3b (LEC 30, port #2). Notice that the change in the port usage does not affect ELAN groupings.

Figure 3:
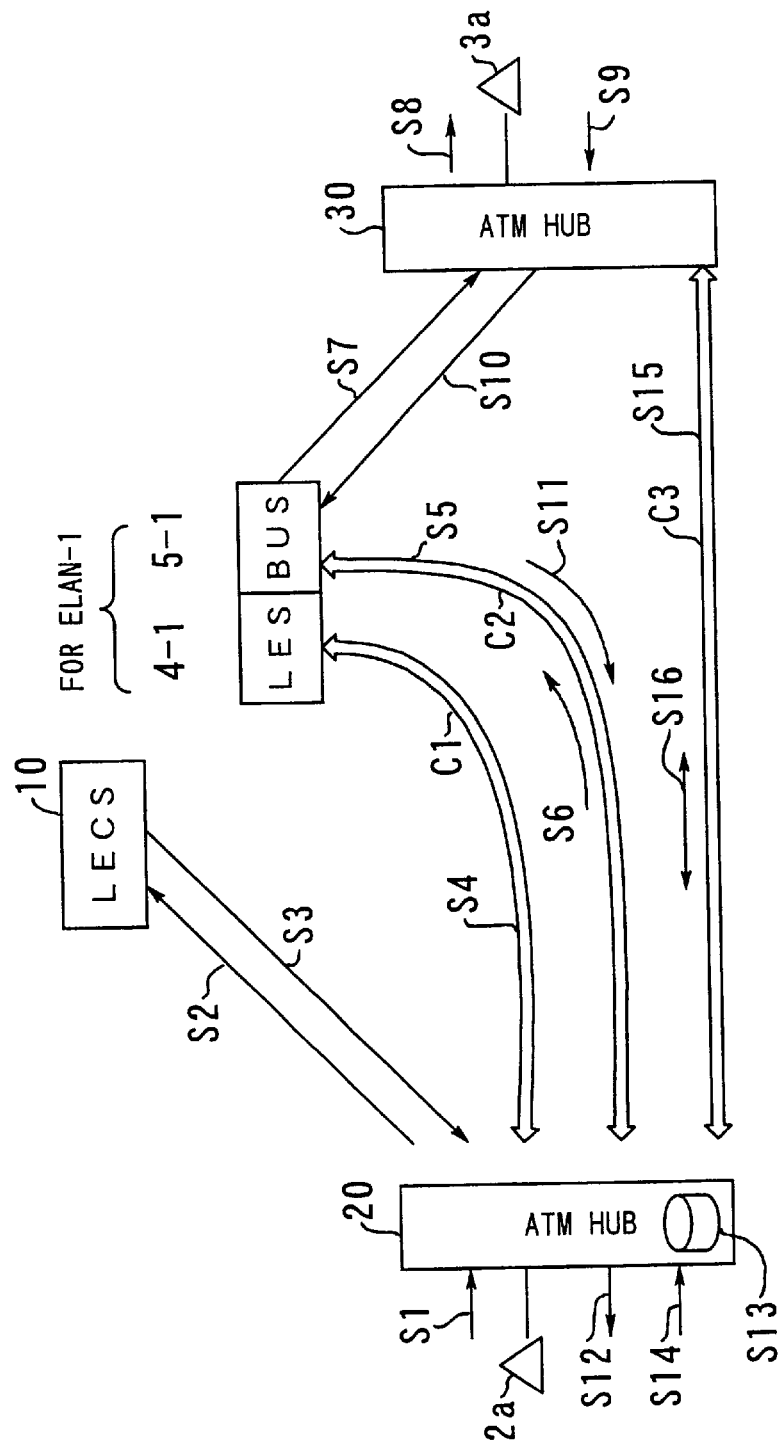
FIG. 3 is a diagram which shows how the proposed ELAN-assigning communications system operates.

Referring next to FIG. 3, the operation of the proposed ELAN-assigning communications system will be described in more detail below. In the following section, what have been referred to as the LECs 20 and 30 will be called the ATM hubs 20 and 30, respectively.

Consider here that the station 2a has a message to send to its peer station 3a on the ELAN-1. In this case, the ATM hub 20 extracts the destination MAC address from the Ethernet frame received from the station 2a. Using this MAC address as the keyword, the ATM hub 20 obtains the ATM address of the ATM hub 30 which serves the destination station 3a. The obtained ATM address is used to set up an ATM connection between the two ATM hubs 20 and 30. This connection allows the stations 2a and 3a to enjoy LAN emulation services. This process is executed according to the following steps.

(S1) The station 2a broadcasts an Address Resolution Protocol (ARP) request frame to get the MAC address of the station 3a.

(S2) Receiving the ARP request, the ATM hub 20 extracts the source IP address (i.e., the logical address of the station 2a) from the received ARP request. The ATM hub 20 knows the ATM address of the LECS 10 and has a pre-established ATM connection to the LECS 10. Through this connection, the ATM address requesting unit 21 notifies the LECS 10 of the extracted source IP address.

(S3) The ATM transmission controller 12 in the LECS 10 receives the IP address of the station 2a. The ATM address manager 11 finds that the received IP address of the source station is associated with the LES 4-1 in terms of emulated LAN groupings, and accordingly, it retrieves the ATM address of the LES 4-1. Then the ATM transmission controller 12 sends that address back to the requesting ATM hub 20.

(S4) The ATM hub 20 sets up an ATM connection C1 to the LES 4-1 by using the ATM address obtained at step S3. With this ATM connection, the ATM address requesting unit 21 asks the LES 4-1 about the ATM address of the BUS 5-1. The LES 4-1 provides the requested ATM address since it has the information previously.

(S5) The ATM hub 20 sets up another ATM connection C2 to the BUS 5-1 by using the ATM address obtained at step S4.

(S6) The ATM hub 20 forwards the ARP request to the BUS 5-1.

(S7) The BUS 5-1 broadcasts the ARP request to all the LECs belonging to the ELAN-1. The LEC 30 identifies the received ARP request as being relevant to itself, while other LESs (not shown in FIG. 3) discard the request.

(S8) The station 3a receives the ARP request via the ATM hub 30.

(S9) In response to the ARP request, the station 3a returns an ARP reply message containing its own MAC address.

(S10) The ATM hub 30 forwards the ARP reply to the BUS 5-1.

(S11) The BUS 5-1 forwards the ARP reply to the ATM hub 20.

(S12) The ATM hub 20 passes the ARP reply to the requesting station 2a. From this ARP reply message, the station 2a learns the MAC address of the destination station 3a.

(S13) The ELAN configuration database 22 in the ATM hub 20 saves ELAN parameters obtained in the above transaction for future use. They include: IP address of station 2a, ATM address of LES 4-1, ATM address of BUS 5-1, and VPI and VCI values of ATM connections C1 and C2.

(S14) Now that the MAC address of the station 3a is known, the station 2a sends data frames with the header containing that destination MAC address, just in the same way as it does with the Ethernet LAN.

(S15) Not knowing how to reach the ATM hub 30 serving the destination station 2a, the ATM hub 20 asks the LES 4-1 about the ATM address of the ATM hub 30. With the obtained ATM address of ATM hub 30, the ATM hub 20 establishes an ATM connection C3.

(S16) The ATM connection C3 is used to transfer data between the peer stations 2a and 3a on the ELAN-1.

The data communication unit 23 performs this data transmission and reception.

Referring next to FIGS. 4 and 5, the functions of the ATM address manager 11 will be described in more detail below. The ATM address manager 11 manages the associations between the IP subnet addresses of LAN stations and the ATM addresses of LESs, and to this end, it employs an ATM address resolution table discussed below.

FIG. 4 shows an example of the ATM address resolution table. Each entry of this ATM address resolution table 11-1 comprises the following two data fields: IP subnet address 11a-1 and LES ATM address 11a-2. The IP subnet address field 11a-1 contains a subnet address representing a range of IP addresses that is defined by what is known as the "subnet mask." This subnet address actually represents the entire group of member stations of a particular ELAN, and that ELAN is supported by one of the LESs deployed on the ATM network. The LES ATM address field 11a-2 of the table 11-1 contains the ATM address of such a LES.

Referring to the table 11-1 of FIG. 4, the first entry gives the following information: (1) there is an ELAN with IP subnet address of "133.162.1.0"; and (2) its associated LES can be reached by using ATM address "71872222." Suppose, for example, that the ATM hub 20 has specified "133.162.1.50" as the IP address of the source station 2a. Using this address value as the keyword, the ATM address manager 11 in the LECS 10 searches the ATM address resolution table 11-1 to find a relevant LES ATM address. In the present example, the ATM address manager 11 yields an address value of "71872222," which is the ATM address of the LES in question that shares the same ELAN-ID with the station 2a.

FIG. 5 shows another example of the ATM address resolution table. This ATM address resolution table 11-2 differs from the above-described ATM address resolution table 11-1 in that it has another information field, ELAN-ID 11a-3. The first entry of the illustrated table indicates the following information: (1) there is an ELAN with IP subnet address of "133.162.1.0"; (2) its associated LES can be reached by using ATM address "71872222"; and (3) its ELAN-ID is "1" (i.e., it belongs to ELAN-1). Recall that the ATM hub 20 may request the LECS 10 to provide the ATM address of a LES. Because the table 11-2 records the ELAN-ID of each subnet, the ATM address manager 11 can respond to such an ATM address request that contains a specific ELAN-ID, instead of the destination IP address.

Figure 6A:
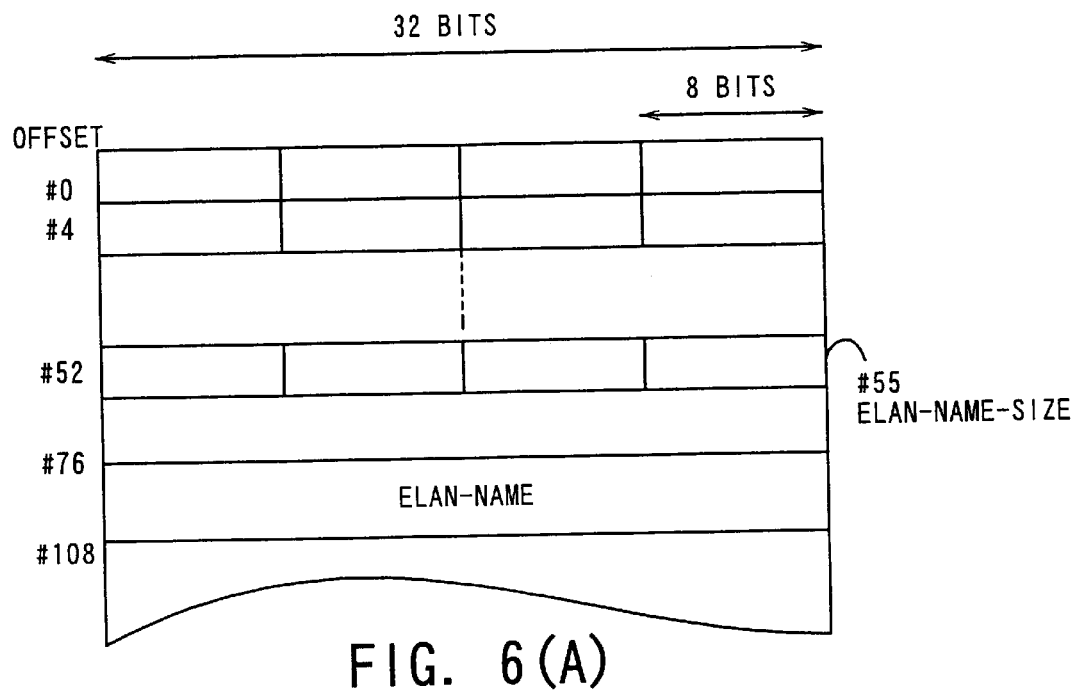
FIGS. 6(A) and 6(B) show a proposed format of configuration request messages in contrast to the standard frame format.

Referring next to FIGS. 6(A) to 7(B), the function of the ATM address requesting unit 21 will be described in more detail below. The primary role of the ATM address requesting unit 21 is to assemble and send address request messages to the LECS 10, the messages containing either the destination IP address or ELAN-ID. FIG. 6(A) and 6(B) show the format of such address request messages. More specifically, FIG. 6(A) depicts a standard LE_CONFIGURE_REQUEST frame, a configuration request message to be sent from the ATM hub 20 to LECS 10. According to the ATM Forum LANE specifications, the offset #55 of this LE_CONFIGURE_REQUEST frame is defined as ELAN-NAME-SIZE, which indicates the number of octets in the ELAN-NAME field (offset #76–#107).

Figure 6B:
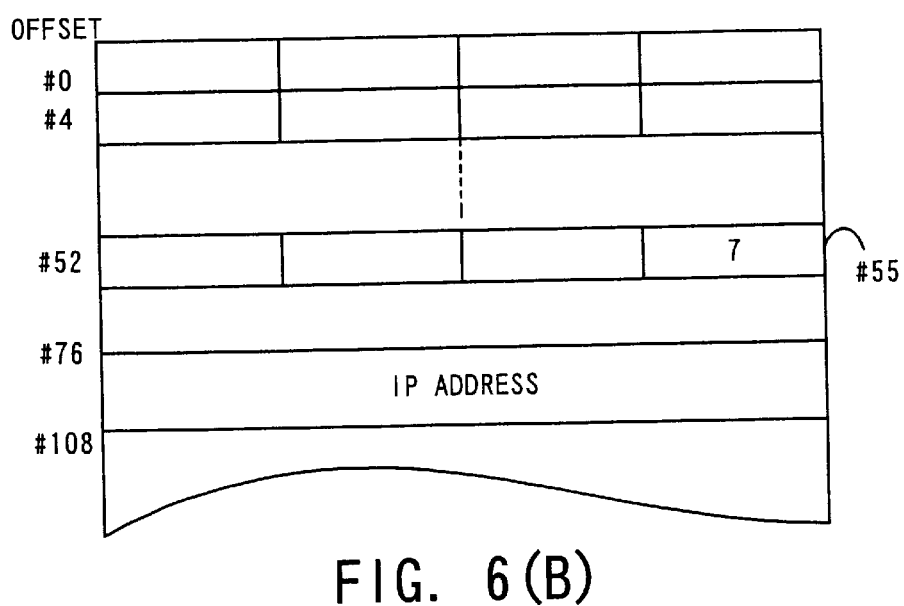

In one implementation of the present invention, the ELAN-NAME-SIZE field is used not only to show the size of ELAN-NAME, but also to indicate whether the ELAN-NAME field contains an IP address or ELAN-ID. FIG. 6(B) shows an example of this proposed usage, in which the ELAN-NAME-SIZE field contains a value of seven. In this case, the ELAN-NAME field conveys an IP address value (e.g., "133.162.1.50"). When the ELAN-NAME-SIZE is set to a value other than seven, the ELAN-NAME field value should be interpreted as an ELAN-ID. ELAN-ID is equivalent to what the LANE specifications define as "ELAN-NAME."

Figure 7A:
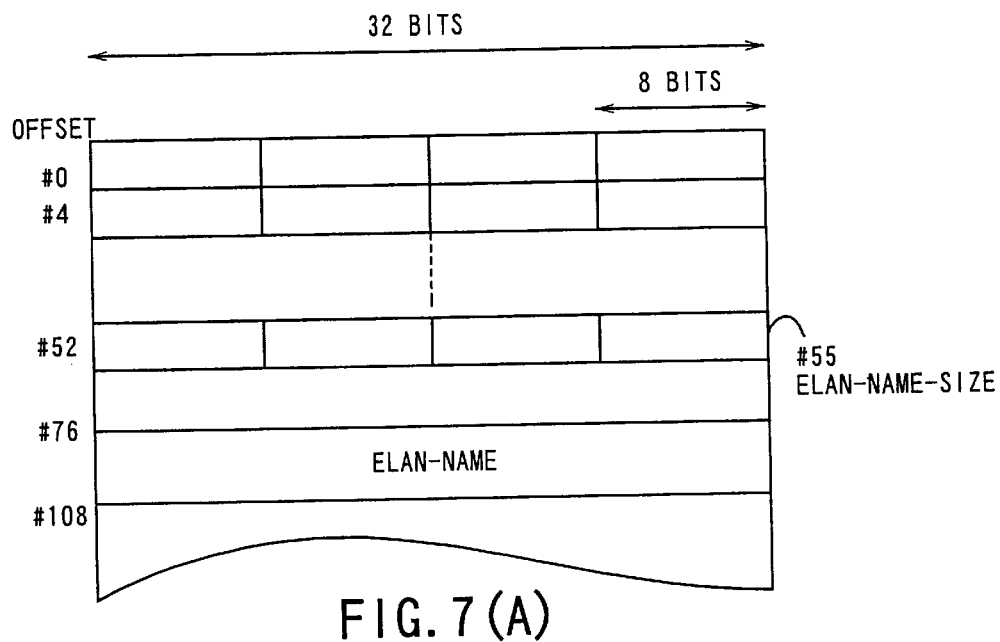
FIGS. 7(A) and 7(B) show another proposed format of address request messages in contrast to the standard frame format.
Figure 7B:
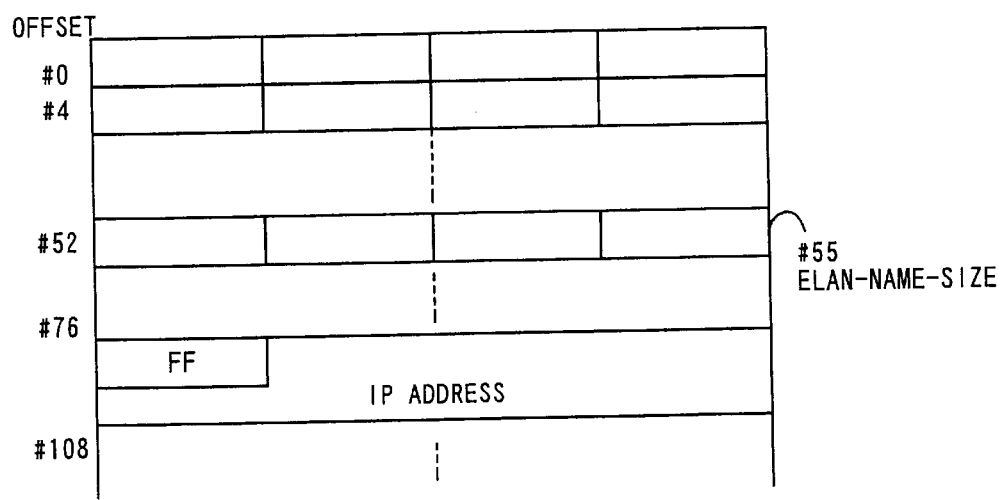

In another implementation of the present invention, the first octet of the ELAN-NAME field is used to indicate whether the ELAN-NAME field contains an IP address or ELAN-ID. FIG. 7(B) shows an example of this ELAN-NAME field usage, while FIG. 7(A) shows the standard frame format for comparison. That is, when the first octet (offset #76) of the ELAN-NAME field is all-1s, or "FF" in hexadecimal notation, the remaining octets (offset #77–#107) of the field contain an IP address. When the first octet is not "FF," the remaining octets (e.g., offset #77) are used to indicate an ELAN-ID.

The ATM hub 20 may send a configuration request message, encoding either the IP address or ELAN-ID in question into appropriate data fields as proposed above. The ATM address manager 11 receives this message and tests the value of the ELAN-NAME-SIZE field or other predetermined octet of the received frame, depending on the implementation. Through this test, the ATM address manager 11 determines which content type is intended by the requester, IP address or ELAN-ID. It should be noted here that the present invention is not limited to any specific frame formats such as those shown in FIGS. 6(B) and 7(B), but may be implemented in other ways (e.g., distinguishing the content types by the number of digits).

Referring next to FIG. 8, the function of the ELAN-ID manager 24 in the ATM hub 20 will be described in more detail below. The primary role of the ELAN-ID manager 24 is to manage the associations between the IP subnet address and ELAN-ID for each attached station, and to this end, it employs an ELAN-ID resolution table. FIG. 8 shows an example of this ELAN-ID resolution table.

Each entry of the illustrated ELAN-ID resolution table 24-1 has the following two data fields: IP subnet address field 24a-1 and ELAN-ID field 24a-2. The first entry, for example, indicates the following information: (1) there is an ELAN with an IP subnet address of "133.162.1.0"; and (2) its ELAN-ID is "1" (i.e., it belongs to ELAN-1). Recall that the ATM hub 20 may request the LECS 10 to provide the ATM address of an appropriate LES when its local station attempts to join the network. By employing an ELAN-ID resolution table 24-1 configured as above, the ELAN-ID manager 24 can send an address request message to the LECS 10, specifying the ELAN-ID of the source station, instead of its IP address. Using the received ELAN-ID as the keyword, the ATM address manager 11 searches its ATM address resolution table 11-2 to find a relevant LES ATM address.

Referring next to FIG. 9, the function of the ELAN configuration database 22 will be described in more detail below. The primary role of the ELAN configuration database 22 is to collect and manage the ELAN parameters. To this end, the ELAN configuration database 22 employs an ELAN parameter cache table in its local cache memory subsystem. FIG. 9 shows an example of this ELAN data cache table.

Each entry of the illustrated ELAN parameter cache table 22-1 is composed of the following data fields: port number 22a-1, link status 22a-2, IP address 22a-3, LES ATM address 22a-4, LES ATM connection 22a-5, BUS ATM address 22a-6, and BUS ATM connection 22a-7. The ATM hub 20 has a plurality of ports to link with the LAN stations, and the table entries describe how those individual ports are configured. More specifically, the port number field 22a-1 shows the number of a particular port. The link status field 22a-2 indicates whether the port is currently used. When this field 22a-2 is set to "1," it means that the port is used to interface with a station, and that a connection link has been established between them. When the field 22a-2 is set to "0," it suggests that the connection link has not yet been established, or there is station connected to that port. When a station is connected, the IP address field 22a-3 shows its IP address. The station belongs to an ELAN, and every ELAN has a dedicated LES to provide address resolution services and a dedicated BUS to support broadcast traffic. The LES ATM address field 22a-4 of the table 22-1 stores the ATM address of that LES, and the LES ATM connection field 22a-5 contains VPI and VCI values that allow the ATM hub 20 to reach the LES. Further, the BUS ATM address field 22a-6 stores the ATM address of the BUS dedicated to the ELAN, and the BUS ATM connection 22a-7 field contains VPI and VCI values for the ATM hub 20 to reach the BUS.

Figure 10:
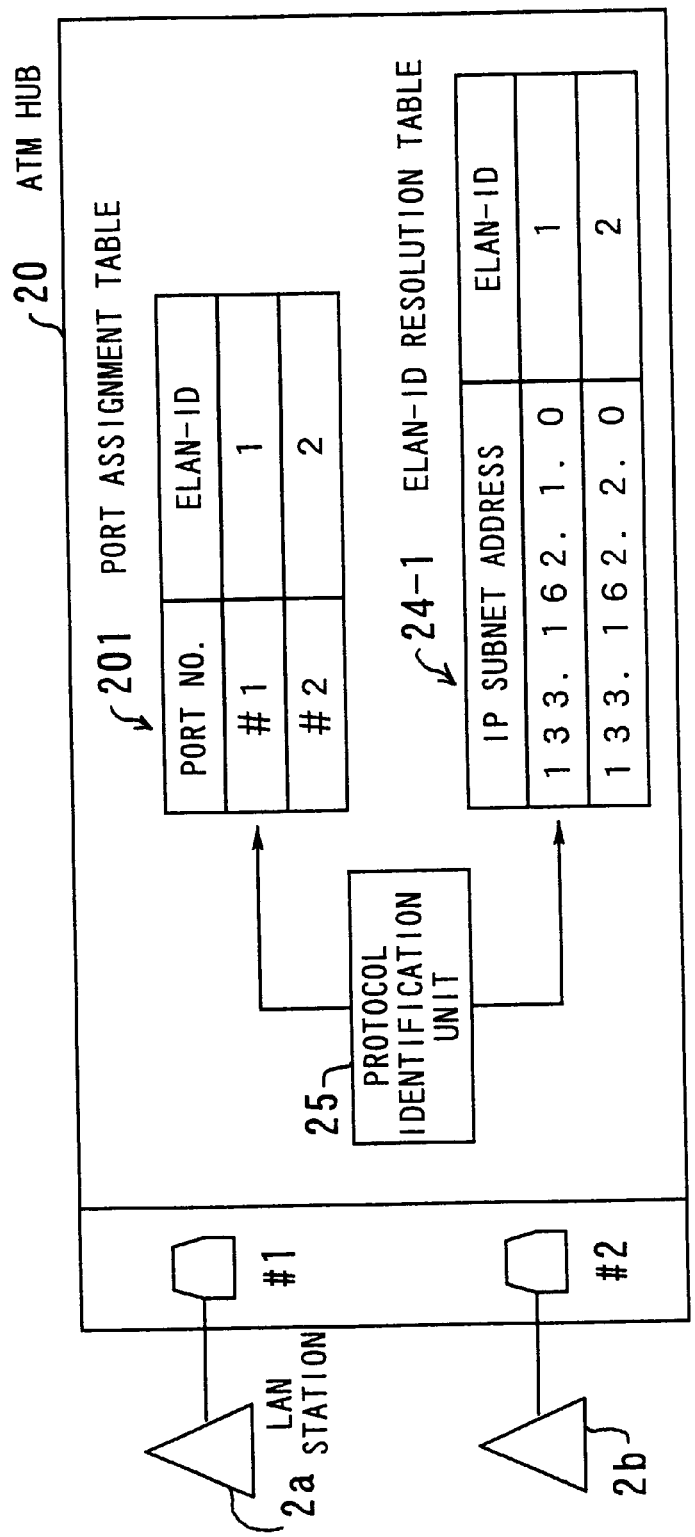
FIG. 10 is a diagram which shows a protocol identification unit and its functions.

Referring next to FIG. 10, the function of the protocol identification unit 25 will be described in more detail below. The illustrated ATM hub 20 has two ports #1 and #2 to link with its local stations 2a and 2b, respectively. To manage the usage of those ports, the ATM hub 20 has a port assignment table 201 coupled to the protocol identification unit 25. This port assignment table 201 maintains ELAN-IDs associated with the port numbers. The protocol identification unit 25 is also coupled to the ELAN-ID resolution table 24-1, which has been described earlier in FIG. 8.

When a message is received from the station 2a, the protocol identification unit 25 examines the received message to identify which protocol the source station 2a is using. If it is revealed that the station 2a is using the TCP/IP protocols, the protocol identification unit 25 enables the ELAN-ID resolution table 24-1. That is, the IP address of the source station 2a is extracted from the received message, and the ELAN-ID resolution table 24-1 gives an ELAN-ID that is associated with the extracted IP address. If it is found, in turn, that the station 2a is using other protocol suite such as NetWare, the protocol identification unit 25 enables the port assignment table 201. This causes the ATM hub 20 to determine that the station 2b connected to the port #2 is a member of ELAN-2. The concept of the protocol identification unit 25 and associated tables is not limited to any particular protocols described in the present example, but may be expanded to handle other message types. With this capability, the proposed ATM hub 20 can support various LAN protocols.

Figure 11:
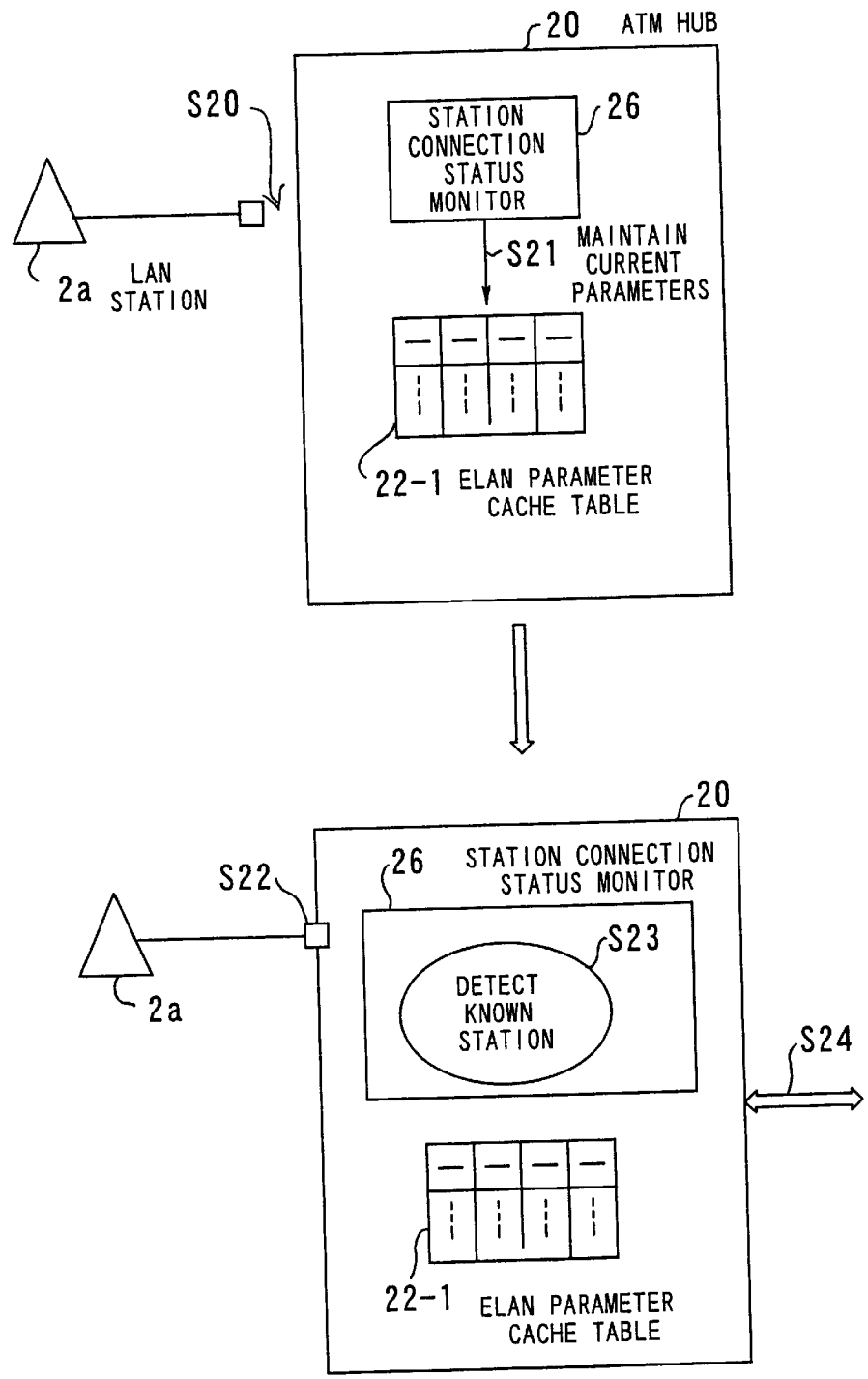
FIG. 11 is a diagram which shows the operation of a station connection status monitor.
Figure 12:
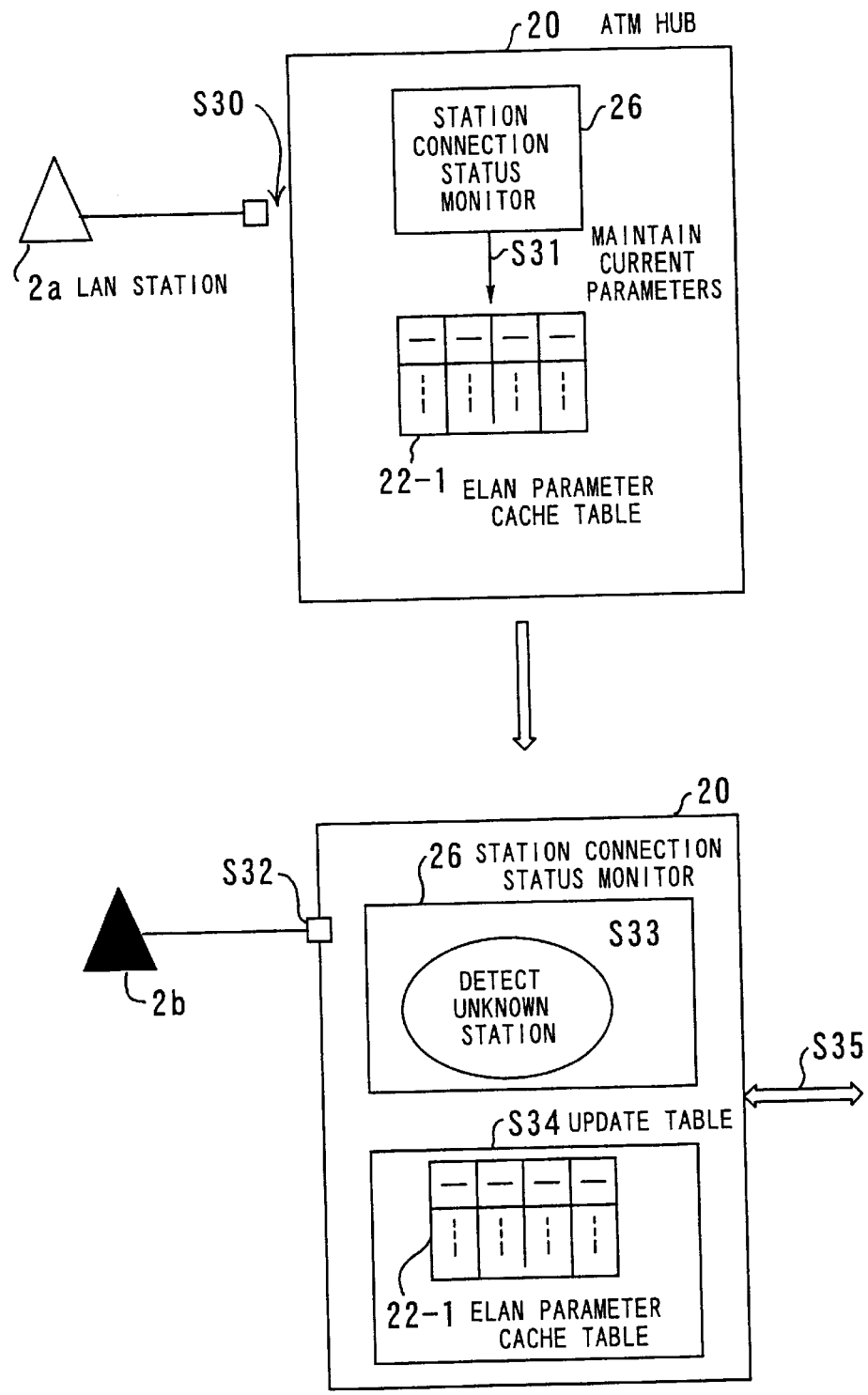
FIG. 12 is another diagram which shows the operation of the station connection status monitor.

Referring next to FIGS. 11 and 12, the station connection status monitor 26 will be described in more detail below. The station connection status monitor 26 monitors the connection status of each station being connected to the ATM hub 20, returning either a "pass" or "fail" status. The "pass" status refers to such a condition where the station in question has an established link with the ATM hub 20. In contrast to this, the "fail" status denotes that the station is disconnected, or that it is connected physically, but has not yet established a link to the ATM hub 20 for some reason.

The operation of the station connection status monitor 26 is illustrated in FIGS. 11 and 12. It is assumed here that the station 2a has once been connected to the ATM hub 20, and that its related ELAN parameters are thus stored in the ELAN configuration database 22. FIG. 11 shows a situation where the station 2a is detached from the ATM hub 20 and then attached again to the same ATM hub 20. The ATM hub 20 handles this event as follows.

(S20) The station 2a is detached from the ATM hub 20.

(S21) The station connection status monitor 26 detects a transition in the connection status of the station 2a, from "pass" to "fail." This event, however, does not affect the current ELAN parameters concerning the station 2a; they are maintained intact in the ELAN configuration database 22.

(S22) The same station 2a is attached to the ATM hub 20.

(S23) The station connection status monitor 26 detects a transition in the station connection status from "fail" to "pass." Examining the IP address of the station in question, the station connection status monitor 26 also understands that the ATM hub 20 has once served that station before. This means that the stored ELAN parameters can be reused to support the station.

(S24) The station 2a can immediately join the network since the ATM hub 20 already knows which ELAN-ID is relevant to it.

FIG. 12 shows a different situation where the station 2a is detached from the ATM hub 20, and instead, another station 2b is attached there. The ATM hub 20 handles this event as follows.

(S30) The station 2a is detached from the ATM hub 20.

(S31) The station connection status monitor 26 detects a transition in the connection status of the station 2a, from "pass" to "fail." This event, however, does not affect the current ELAN parameters concerning the station 2a; they remain intact in the ELAN configuration database 22.

(S32) A different station 2b is attached to the ATM hub 20.

(S33) The station connection status monitor 26 detects a transition in the station connection status from "fail" to "pass." Examining the IP address of the station in question, the station connection status monitor 26 understands that the ATM hub 20 has never served that station before.

(S34) The station connection status monitor 26 produces a new set of ELAN parameters for the station 2b, which is to be maintained in the LAN configuration database 22.

(S35) The station 2b can communicate with its peer stations after the ELAN configuration database 22 is updated with the new entry.

As seen from the above processing steps, the station connection status monitor 26 permits the ATM hub 20 to reconfigure itself more flexibly, according to the connection status of stations.

Figure 13:
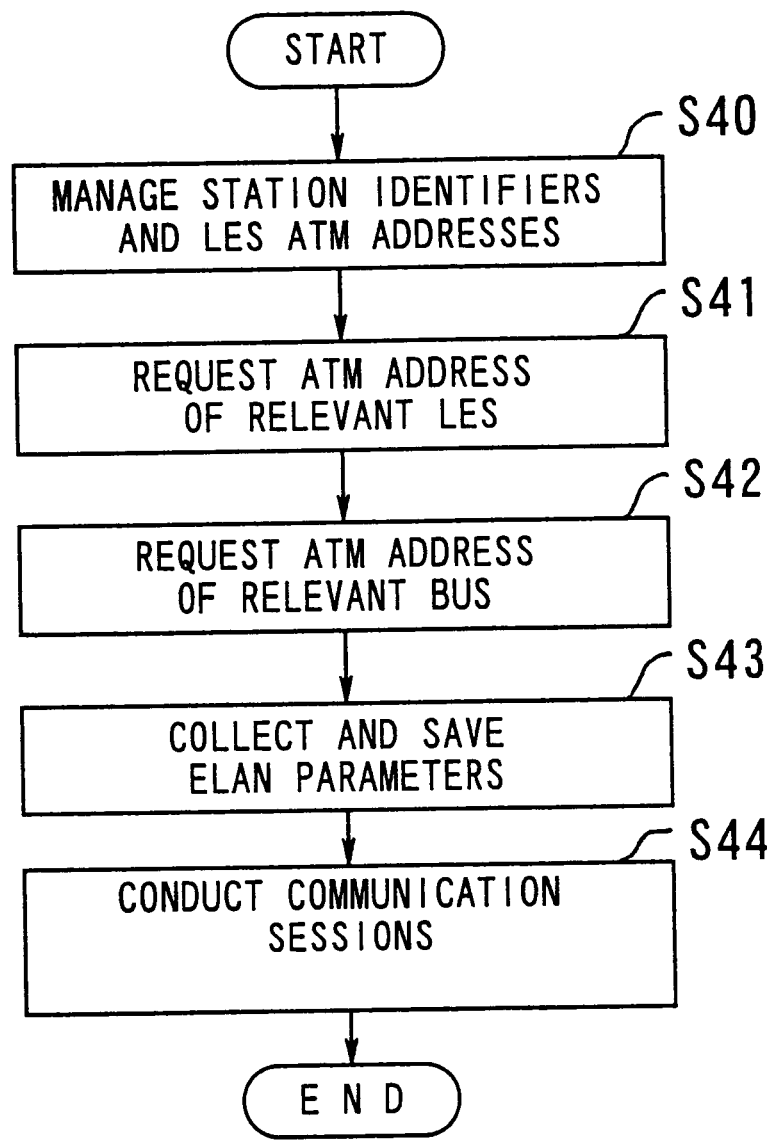
FIG. 13 is a flowchart which shows a communication method according to the present invention.
Figure 14:
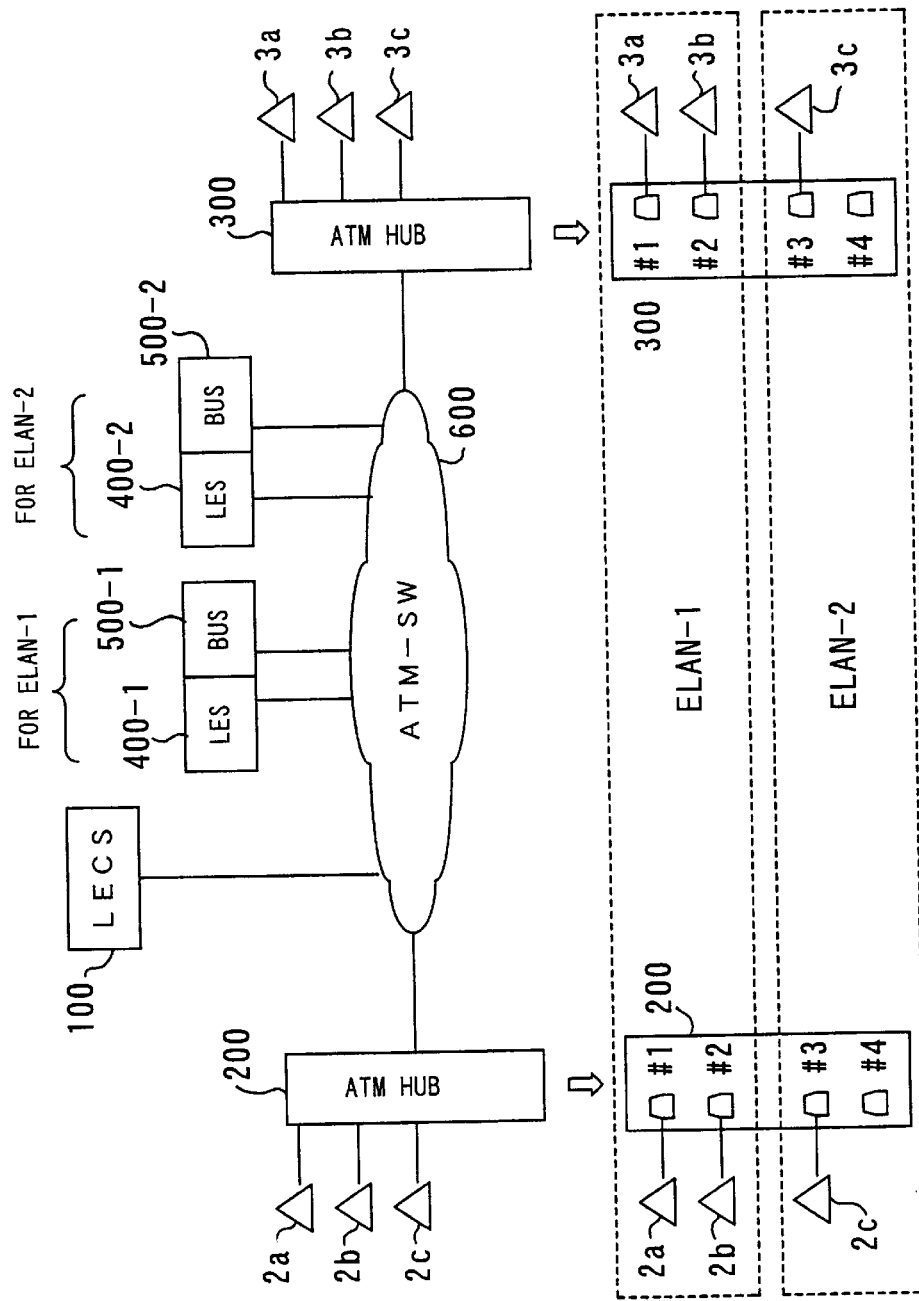
FIG. 14 is a diagram which shows a typical network configuration which realizes LAN emulation services on an ATM transport system.

Referring next to the flowchart of FIG. 13, an ELAN-assigning communication method will be described. According to present invention, the method comprises the following processing steps.

(S40) The LECS manages the associations between the identifiers of stations and the ATM addresses of LESs serving ELANs to which the stations are assigned.

(S41) An ATM address request containing the identifier of a specific station is sent from a LEC to the LECS, requesting the ATM address of an appropriate LES that is relevant to that station. An ATM connection is then established between the requesting LEC and the relevant LES.

(S42) Another ATM address request is sent from the LEC to the BUS serving the ELAN of interest. An ATM connection is then established between the requesting LEC and that BUS.

(S43) The requesting LEC stores ELAN parameters, which include: the identifier of the station, the ATM address obtained as a result of the above ATM address requests, and the information about the established ATM connections.

(S44) An ATM connection is established between the source and destination LECs for data transport purposes. The requesting station begins a communication session with a remote station within the same ELAN, according to the related ELAN parameters.

The above discussion will now be summarized as follows. According to the proposed ELAN-assigning communications system and method, ELAN parameters are collected for use in a subsequent communication session. The ELAN parameters include: IP address of each station, ATM addresses of relevant LESs and BUSs, and information about pre-established ATM connections to reach the relevant LESs and BUSs. The proposed ATM hubs can be configured without human intervention since the IP address of a station is used to assign an appropriate ELAN-ID to that station. Further, the proposed ATM hubs can coexist with conventional ATM hubs, which require manual setup of each port to assign an appropriate ELAN. It is therefore possible to construct an LANE system by integrating network devices from different vendors. The proposed communications system can work in such heterogeneous environments.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communications system which constructs emulated LAN environments on a connection-oriented network, comprising:

(a) a plurality of LAN stations each having an identifier;

(b) a LAN emulation server employed in each emulated LAN environment to provide address resolution services thereon, each LAN emulation server having a network address on the connection-oriented network;

(c) a broadcast server employed in each emulated LAN environment to support broadcast traffic thereon;

(d) a LAN emulation configuration server, comprising address management means for managing associations between the identifiers of the LAN stations and the network addresses of the LAN emulation servers, and when a specific identifier is given, determining which network address is relevant to the given identifier; and (e) a LAN emulation client coupled to at least one of said LAN stations, comprising:

address requesting means for requesting said LAN emulation configuration server to provide the network address of the LAN emulation servers, and requesting said LAN emulation servers to provide the network address of the broadcast servers associated therewith, parameter management means for storing operating parameters for the emulated LAN environments, the operating parameters including the identifiers of the LAN stations, the network addresses obtained in response to the request from said address management means, and information about connections, and data communication means for transferring data according to the parameters stored in said parameter management means.

2. The communications system according to claim 1, wherein said address management means further stores emulated LAN identifiers associated with the network addresses of the LAN emulation servers, and when a specific emulated LAN identifier is given, determines which network address is relevant to the given emulated LAN identifier.

3. The communications system according to claim 2, wherein said address requesting means sends to said LAN emulation configuration server a request message containing one of the identifiers of the LAN stations or one of the emulated LAN identifiers.

4. The communications system according to claim 1, wherein said LAN emulation client further comprises emulated LAN identifier management means for managing associations between the identifiers of the LAN stations and the emulated LAN identifiers, and when a specific identifier is given, determining which network address is relevant to the given identifier.

5. The communications system according to claim 1, said LAN emulation client further comprises protocol identification means for analyzing data sent from the LAN stations to identify which communication protocol the LAN stations use.

6. The communications system according to claim 1, said LAN emulation client further comprises station connection status monitoring means for monitoring connection status, either "pass" or "fail", of each LAN station being coupled to said LAN emulation client.

7. The communications system according to claim 6, wherein:

said parameter management means records the identifiers of the LAN stations that have once been coupled to said LAN emulation client; and said parameter management means updates the parameters stored therein, if said station connection status monitoring means has detected a transition from "fail" to "pass" in the connection status of a specific LAN station, and if the identifier of the specific LAN station is different from any of the identifiers recorded in said parameter management means.

8. A LAN emulation configuration server which responds to request messages from LAN emulation clients by returning a network address of an appropriate LAN emulation server selected from among those deployed on a connection-oriented network, comprising:

address management means for managing associations between identifiers of LAN stations and the network addresses of the LAN emulation servers, and when a specific identifier is given, determining which network address is relevant to the given identifier; and transmission control means for receiving the request messages and returning the determined network addresses over a connection established on the connection-oriented network.

9. A LAN emulation client which allows LAN stations coupled thereto to operate in an emulated LAN environment, comprising:

address requesting means for sending request messages so as to obtain the network addresses of a LAN emulation server and a broadcast server providing services for the emulated LAN environment to which the LAN stations belong;

parameter management means for storing parameters related to the emulated LAN environment which include identifiers of the LAN stations, the network addresses obtained by said address management means as a result of the address request messages, and information about connections; and data communication means for transferring data according to the parameters stored in said parameter management means.

10. A communication method which provides emulated LAN environments constructed on a connection-oriented network, comprising the steps of:

(a) at a LAN emulation configuration server, managing associations between identifiers of LAN stations and network addresses of LAN emulation servers supporting the individual emulated LAN environments;

(b) sending a request message from a LAN emulation client to the LAN emulation configuration server, the request message containing the identifier of a specific LAN station to request the network address of a LAN emulation server that is relevant to the specific LAN station;

(c) sending an address request message from the LAN emulation client to the relevant LAN emulation server, so as to obtain the network address of a broadcast server supporting the emulated LAN environment to which the specific LAN station belongs;

(d) storing operating parameters in the LAN emulation client, which include the network addresses returned in response to the request message sent at said step (b) and the address request message sent at said step (c), and information about network connections established to reach the LAN emulation server and broadcast server; and (e) conducting a communication session between the LAN stations within the emulated LAN environment, according to the stored operating parameters.

11. The communications system according to claim 1, wherein;

said LAN stations use TCP/IP protocols to communicate with each other; and the identifiers of the LAN stations used in said LAN emulation configuration server and LAN emulation client are IP subnet addresses of said LAN stations.

* * * * *